(12) United States Patent
Nishiji et al.

(10) Patent No.: US 9,199,533 B2
(45) Date of Patent: Dec. 1, 2015

(54) VEHICLE DIFFERENTIAL APPARATUS

(71) Applicant: JTEKT Corporation, Osaka (JP)

(72) Inventors: Makoto Nishiji, Brussels (BE); Tomoki Yoshihama, Brussels (BE)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/339,614

(22) Filed: Jul. 24, 2014

(65) Prior Publication Data

US 2015/0175000 A1 Jun. 25, 2015

(30) Foreign Application Priority Data

Dec. 19, 2013 (JP) .................. 2013-263031

(51) Int. Cl.
| | | |
|---|---|---|
| F16H 48/08 | (2006.01) | |
| B60K 17/16 | (2006.01) | |
| F16H 48/24 | (2006.01) | |
| F16H 48/28 | (2012.01) | |

(52) U.S. Cl.
CPC ............... B60K 17/16 (2013.01); F16H 48/08 (2013.01); F16H 48/24 (2013.01); *F16H 2048/085* (2013.01); *F16H 2048/282* (2013.01)

(58) Field of Classification Search
None
See application file for complete search history.

(56) References Cited

U.S. PATENT DOCUMENTS

| | | | |
|---|---|---|---|
| 5,782,717 A | 7/1998 | Smothers et al. | |
| 8,079,929 B2 * | 12/2011 | Yeh .............................. | 475/230 |
| 2004/0157696 A1 | 8/2004 | Saito et al. | |
| 2004/0182647 A1 | 9/2004 | Watanabe et al. | |
| 2005/0282677 A1 | 12/2005 | Saito et al. | |
| 2008/0194373 A1* | 8/2008 | Suzuki et al. .................. | 475/230 |
| 2010/0029434 A1* | 2/2010 | Nakajima et al. ............. | 475/230 |
| 2010/0184552 A1* | 7/2010 | Soybel et al. ................. | 475/230 |
| 2011/0021305 A1* | 1/2011 | Radzevich ..................... | 475/230 |

FOREIGN PATENT DOCUMENTS

| | | |
|---|---|---|
| EP | 1 460 315 A2 | 9/2004 |
| JP | 2010-53890 | 3/2010 |

OTHER PUBLICATIONS

Extended European Search Report issued Nov. 5, 2014 in Patent Application No. 14173210.7

* cited by examiner

*Primary Examiner* — Ramya Burgess
*Assistant Examiner* — Lillian Nguyen
(74) *Attorney, Agent, or Firm* — Oblon, McClelland, Maier & Neustadt, L.L.P.

(57) ABSTRACT

A vehicle differential apparatus is provided with: a differential case rotatable around a rotation axis in which a first shaft insertion hole is formed along a direction perpendicular to the rotation axis, a pair of side gears, a pinion gear meshing with the paired side gears in which a second shaft insertion hole is formed in an axial center portion of the pinion gear, and a pinion shaft including an insertion end portion inserted in the first shaft insertion hole of the differential case and a pinion gear support portion inserted in the second shaft insertion hole of the pinion gear to rotatably support the pinion gear. The pinion gear is supported so as to be movable in the rotation axis direction by a meshing reaction force generated from a meshing engagement with the pair of side gears.

11 Claims, 4 Drawing Sheets

VEHICLE DIFFERENTIAL APPARATUS

BACKGROUND OF THE INVENTION

1. Field of the Invention

The invention relates to a vehicle differential apparatus.

2. Related Art

Conventionally, as a vehicle differential apparatus, there is known an apparatus which includes a differential case to be rotated by engine torque applied thereto, a pair of side gears arranged in parallel along a rotation axis of the differential case, a plurality of pinion gears respectively meshing with the side gears, and a pinion shaft for supporting the pinion gears (see, for example, JP-A-2010-053890).

In the vehicle differential apparatus disclosed in JP-A-2010-053890, a first pinion gear support member (pinion shaft) includes two projection portions respectively projecting axially from its two end portions. A case main body of the differential case includes two guide portions constituted of recessed grooves engageable with the projection portions. In assembling, the first pinion gear support member can be moved along the guide portions in a direction of axles. Also, the pinion gears are supported while inserted in insertion holes of a second plate-shaped pinion gear support member. The movement of the second pinion gear support member in the axle direction is controlled by a case cover to be mounted onto the case main body of the differential case.

In the above-structured vehicle differential apparatus of JP-A-2010-053890, the first pinion gear support member, the multiple pinion gears and the second pinion gear support member can be assembled outside the differential case to constitute an assembled body and the assembled body can be moved in the axle direction along the guide portions within the differential case and can be assembled to the differential case. Thus, the apparatus assembling operation can be simplified.

In addition, in the vehicle differential apparatus of JP-A-2010-053890, a thrust washer is disposed between an inner surface of the differential case and a back surface of the side gear. Thus, a friction resistance caused by sliding motion between the thrust washer and the side gear and a friction resistance caused by sliding motion between an inner peripheral surface of an insertion hole of the second pinion gear support member and an outer peripheral surface of the pinion gear act as differential limiting force for limiting the differential rotation of the paired side gears.

A vehicle differential apparatus of this kind is required to raise the differential limiting force in order to reduce a slippage of wheels and enhance a driving stability in a low μ road such as a bad road and an icy road. In addition, in the above-structured vehicle differential apparatus, a groove machining work to form within the differential case a recessed groove extending in the axle direction, when compared with a round hole machining work, takes time and labor and also is hard to secure work accuracy.

SUMMARY OF THE INVENTION

One or more embodiments of the invention provide a vehicle differential apparatus which is easy to manufacture, can secure work accuracy, and can raise differential limiting force to enable a vehicle to run stably.

BRIEF DESCRIPTION OF THE DRAWINGS

FIG. 4A is an exploded perspective view. FIG. 4B is a perspective view, showing an assembled state. FIG. 4C is a section view taken along C-C line shown in FIG. 4B. FIG. 4D is a perspective view of a modification.

DETAILED DESCRIPTION OF THE EMBODIMENTS

First Embodiment

Figure 1:
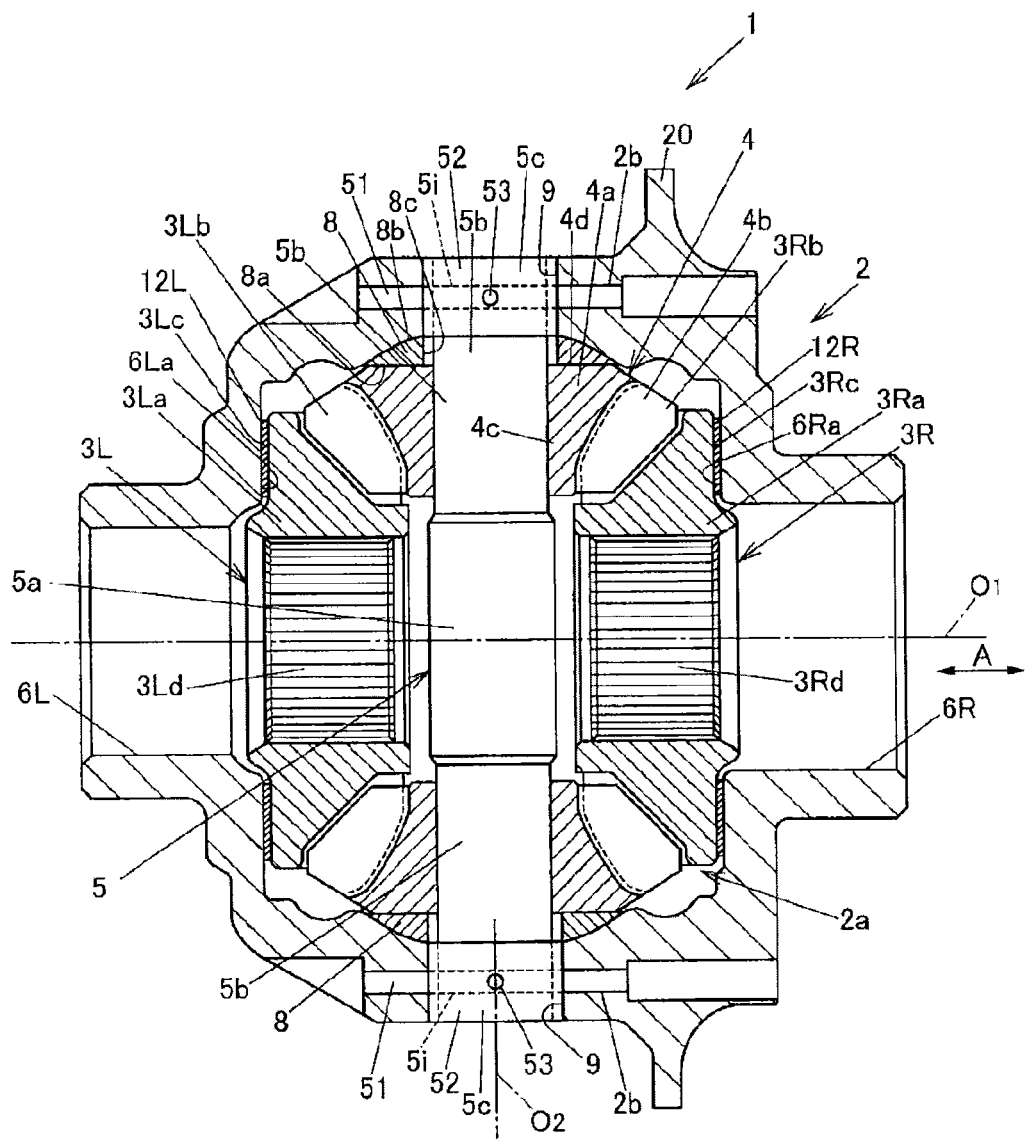
FIG. 1 is a section view of a vehicle differential apparatus according to a first embodiment, explaining a whole structure thereof.

FIG. 1 is a section view of a vehicle differential apparatus according to a first embodiment, explaining a whole structure. FIG. 1 shows a section of the vehicle differential apparatus when it is cut along a rotation axis of a differential case.

The vehicle differential apparatus 1 includes mainly a differential case 2 rotatable around the rotation axis $O_1$ by a driving power of an engine serving as a drive source of a vehicle, a pair of side gears 3L, 3R accommodated rotatably within the differential case 2 and respectively so connected to a pair of axles (drive shafts) as are unrotatable relative thereto, a pair of pinion gears 4 respectively meshing with the paired side gears 3L, 3R with their gear axes crossing each other at right angles, a pinion shaft 5 having an axis $O_2$ on the gear axes of the paired pinion gears 4 for supporting the paired pinion gears 4, and a pair of guide members 52 for guiding the movement of the pinion gears 4 in the rotation axis $O_1$ direction.

<Structure of Differential Case 2>

The differential case 2 includes therein an accommodating space 2a for accommodating the side gears 3L, 3R, the pinion gears 4, the pinion shaft 5 and the like.

The differential case 2 has a pair of axle insertion holes 6L, 6R opened along the rotation axis $O_1$, and a pair of shaft insertion holes 9 having their axes in a direction perpendicular to the respective axes of the paired axle insertion holes 6L, 6R and capable of receiving insertion end portions 5c of the pinion shaft 5. The differential case 2 also has pin holes 2b for receiving guide pins 51 to be penetrated through penetration holes 5i formed in the pinion shaft 5.

Each of the shaft insertion holes 9 is formed as a penetration hole which penetrates through the differential case 2 along a direction perpendicular to the rotation axis $O_1$. More specifically, the each of the shaft insertion holes 9 is a round hole. The guide members 52 are accommodated in these shaft insertion holes 9 respectively.

To form the each of the shaft insertion hole 9, for example, a drilling tool such a drill may be moved in a direction perpendicular to the rotation axis $O_1$ from the outside of the differential case 2 toward the inside thereof (accommodating space 2a).

The differential case 2 is constituted of a one-piece member which accommodates therein the paired side gears 3L, 3R, the pinion gears 4, the pinion shaft 5 and the paired guide members 52. That is, a whole of the differential case 2 is constituted of a single member, while the paired side gears 3L, 3R and the pinion gears 4 are inserted into the accommodating space 2a from an opening (not shown) formed between the paired shaft insertion holes 9 in the peripheral direction of the differential case 2 with the rotation axis $O_1$ as the center thereof.

The differential case 2 also has side gear passage holes (not shown) which are symmetric with respect to the rotation axis $O_1$ and are spaced from each other at equal distances from the shaft insertion holes 9 in the circumferential direction. The differential case 2 further includes, on the right axle side of the outer periphery thereof, a ring-shaped ring gear mounting flange 20 extending along the circumferential direction within a plane crossing the rotation axis $O_1$ at right angles. On receiving rotation driving power from a ring gear to be mounted on the ring gear mounting flange 20, the differential case 2 is rotated around the rotation axis $O_1$.

The paired axle insertion holes 6L, 6R are constituted of insertion holes which communicate with the accommodating space 2a and through which right and left axles (not shown) can be inserted. The axle insertion holes 6L, 6R include, on their inside opening peripheral edges, thrust washer receiving portions 6La, 6Ra. Between the thrust washer receiving portions 6La, 6Ra and side gears 3L, 3R, there are interposed thrust washers 12L, 12R, respectively.

<Structure of Side Gears 3L, 3R>

The side gears 3L, 3R as the substantially annular gears (bevel gears each having an outside diameter larger than the outside diameter of the pinion gear 4 and having a single tooth edge cone angle) respectively include boss portions 3La, 3Ra and gear portions 3Lb, 3Rb formed on the outer peripheral sides of the boss portions, while they are rotatably supported within the differential case 2.

The side gears 3L, 3R include, on their back surfaces, sliding surfaces 3Lc, 3Rc constituted of planes opposed to the thrust washer receiving portions 6La, 6Ra through the thrust washers 12L, 12R. The side gears 3L, 3R also include, in their central portions, spline engaging portions 3Ld, 3Rd with which left and right axles (not shown) are respectively spline engaged through the axle insertion holes 6L, 6R.

<Structure of Pinion Gear 4>

The pinion gears 4 as the bevel gears each include a base portion 4a having a given outside diameter, a gear portion 4b formed on the outer peripheral side of the base portion 4a integrally therewith, and a shaft insertion hole 4c for inserting the pinion shaft 5 therethrough. The gear portions 4b mesh with the gear portions 3Lb, 3Rb of the side gears 3L, 3R. On the end face of the base portion 4a on the opposite side to the rotation axis $O_1$, there is formed a flat gear back surface 4d.

Between the inner surface of the accommodating space 2a of the differential case 2 and the open end face (gear back surface 4d) of the shaft insertion hole 4c of the pinion gear 4, there is interposed a spherical back surface member 8 serving as a spacer. The spherical back surface member 8 includes a sliding surface 8a serving as an opposed surface to the gear back surface 4d of the pinion gear 4, a curved surface 8b formed on the opposite side (on the differential case 2 side) of the sliding surface 8a, and a penetration hole 8c penetrating therethrough in a direction along the axis $O_2$. The gear back surface 4d of the pinion gear 4 and the sliding surface 8a of the spherical back surface member 8, as the flat planes, cross the axial direction of the pinion shaft 5 at right angles.

An inside diameter of the penetration hole 8c is larger than an outside diameter of the pinion shaft 5 and is set for a size which does not interfere with a movement of the pinion shaft 5 in the axle direction A. The gear back surface 4d of the pinion gear 4 is slidable in the axle direction A in contact with the sliding surface 8a of the spherical back surface member 8.

<Structure of Pinion Shaft 5>

The pinion shaft 5 includes a central portion 5a situated centrally in the longitudinal direction thereof, a pinion gear support portion 5b insertable into the shaft insertion hole 4c of the pinion gear 4, and an insertion end portion 5c inserted through the shaft insertion hole 4c of the pinion gear 4 and extended from the gear back surface side in the outer peripheral direction of the differential case 2, while the pinion shaft 5 is interposed between the side gears 3L and 3R. The pinion gear support portion 5b supports the paired pinion gears 4 to be rotatable due to its sliding motion relative to the inner surfaces of the shaft insertion holes 4c of the paired pinion gears 4.

The insertion end portion 5c of the pinion shaft 5 is inserted into the shaft insertion hole 9 of the differential case 2. The insertion end portion 5c of the pinion shaft 5 is interposed between the paired guide members 52 (in FIG. 1, only the guide member 52 on this side is shown). Thus, the pinion shaft 5 and the pinion gears 4 rotatably supported on the pinion shaft 5 are supported to be movable along the guide pins 51 in the axle direction A parallel to the rotation axis $O_1$ of the differential case 2. Next, description is given of the support structures of the pinion shaft 5 and the pinion gears 4.

<Support Structure of Pinion Shaft 5 and Pinion Gear 4>

Figure 2A:
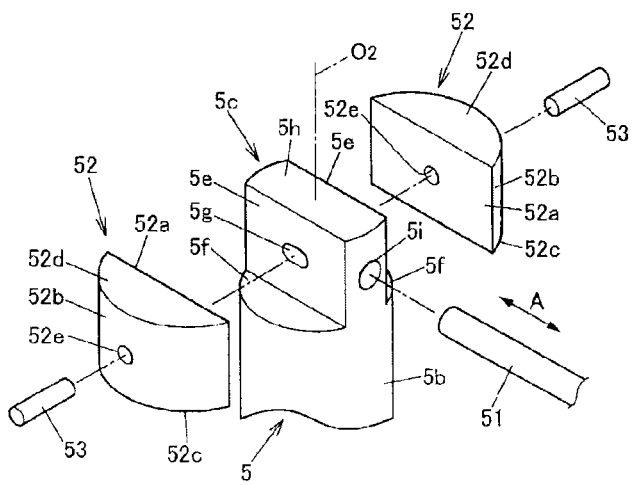
FIG. 2A is an exploded perspective view of a support structure of an insertion end portion of a pinion shaft.
Figure 2B:
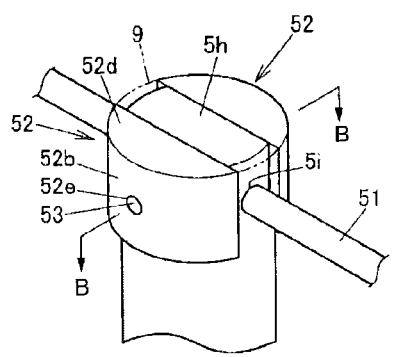
FIG. 2B is a perspective view, showing an assembled state of the support structure of the insertion end portion of the pinion shaft.
Figure 2C:
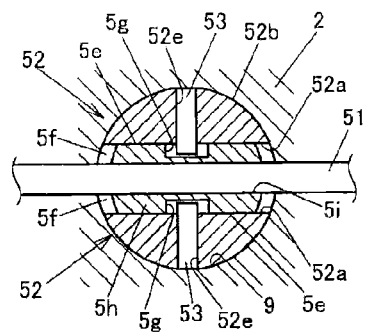
FIG. 2C is a section view taken along B-B line shown in FIG. 2B.

FIGS. 2A to 2C show a support structure of the insertion end portion 5c of the pinion shaft 5. Specifically, FIG. 2A is an exploded perspective view, FIG. 2B is a perspective view showing the assembled state, and FIG. 2C is a section view taken along the B-B line shown in FIG. 2B. Here, the support structures of the insertion end portions 5c in the two end portions of the pinion shaft 5 are similar in structure to each other and thus, in FIG. 2, only one of the support structures of the insertion end portions 5c is shown.

The insertion end portion 5c of the pinion shaft 5 includes a pair of sliding surfaces 5e extending parallel to the axis $O_2$ of the pinion shaft 5 and parallel to the rotation axis $O_1$ (axle direction A), a pair of sliding end faces 5f extending perpendicularly to the sliding surfaces 5e, two elongated holes 5g respectively formed in their associated sliding surfaces 5e and extending along the axle direction A, and a penetration hole 5i which is formed in a sliding projection portion 5h intervening between the sliding surfaces 5e, extends along the axle direction A and is capable of receiving the guide pin 51.

Each guide member 52 includes a peripheral surface 52b as the curved surface corresponding to the inner surface of the shaft insertion hole 9 and a guide surface 52a constituted of a plane, while the section shape of the section of the guide member 52 perpendicular to the axis $O_2$ has an arc surface shape. The peripheral surface 52b has substantially the same radius of curvature as the radius of curvature of the shaft insertion hole 9. The guide member 52 is accommodated in the shaft insertion hole 9 in such a manner that the guide surface 52a is slidable relative to the sliding surface 5e of the insertion end portion 5c of the pinion shaft 5. Thus, due to the sliding motion of the guide surface 52a relative to the sliding surface 5e of the pinion shaft 5, the guide member 52 guides the movements of the pinion shaft 5 and pinion gears 4 in the rotation axis $O_1$ direction.

Each guide member 52 includes an end face 52c contactable with the sliding end face 5f and an end face 52d on the opposite side to the end face 52c, while a penetration hole 52e penetrating from the peripheral surface 52b toward a guide surface 52a is formed parallel to the end faces 52c, 52d. The paired guide members 52 are arranged in the shaft insertion hole 9 in such a manner that their respective guide surfaces 52a are opposed to each other through the sliding projection portion 5h.

A fixing pin 53 is inserted into the penetration hole 52e of the guide member 52. One end of the fixing pin 53 projects from the guide surface 52, while the projecting portion can be engaged into the elongated hole 5g of the pinion shaft 5. This structure prevents the guide member 52 against removal from the insertion end portion 5c of the pinion shaft 5.

As shown in FIG. 2C, the sliding projection portion 5h of the pinion shaft 5 is contacted with the guide surface 52a of the guide member 52, whereby the pinion shaft 5 can be moved in the axle direction A. That is, the difference between the inside diameter of the shaft insertion hole 9 and the outside diameter of the pinion shaft 5 provides the maximum movement amount of the pinion shaft 5 in the axle direction A. Here, the elongated hole 5g is formed to have such length that does not prevent the pinion shaft 5 from moving in the axle direction A within the maximum movement amount.

<Action Provided by Support Structure of Insertion End Portion 5c of Pinion Shaft 5>

Figure 3:
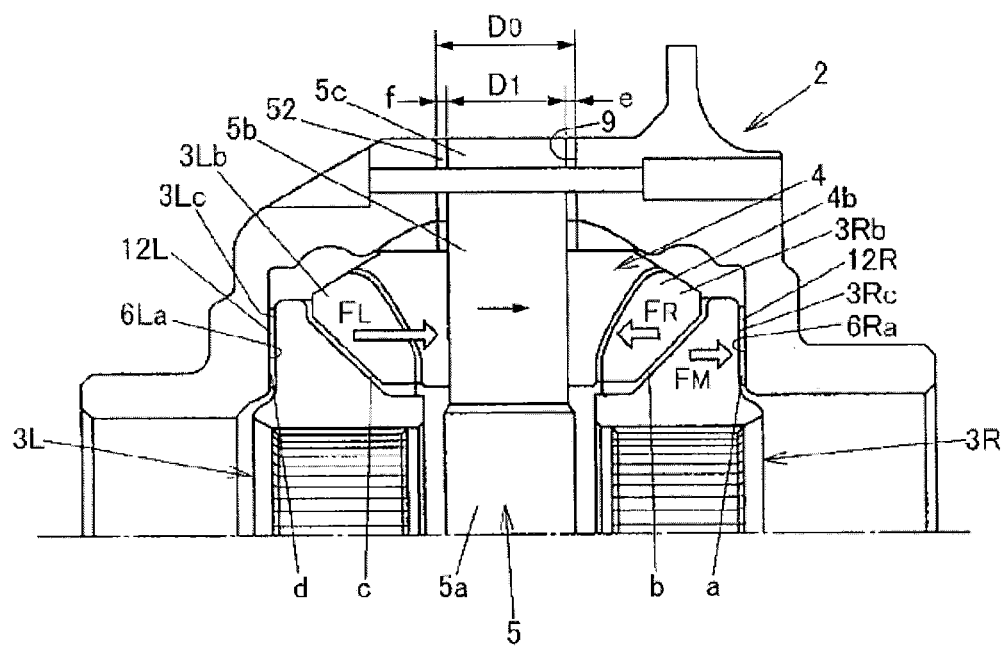
FIG. 3 is an explanatory view to explain an action provided by the support structure of the insertion end portion of the pinion shaft.

FIG. 3 is an explanatory view to explain action to be provided by the support structure of the insertion end portion 5c of the pinion shaft 5.

As shown in FIG. 3, where a character "a" expresses a clearance between the sliding surface 3Rc of the side gear 3R/thrust washer receiving portion 6Ra of the differential case 2 and a thrust washer 12R, "b" a clearance between the side gear 3R and pinion gear 4 in the rotation axis $O_1$ direction, "c" a clearance between the pinion gear 4 and side gear 3L in the rotation axis $O_1$ direction, "d" a clearance between the sliding surface 3Lc of the side gear 3L/thrust washer receiving portion 6La of the differential case 2 and thrust washer 12L, "$D_0$" the inside diameter of the shaft insertion hole 9, "$D_1$" the dimension of the insertion end portion 5c of the pinion shaft 5 in the rotation axis $O_1$ direction (the outside diameter of the insertion end portion 5c), and "e" and "f" ½ of the difference between "$D_0$" and "$D_1$", the relationship among the clearances a to f is set to satisfy the following expression.

$$(a+b+c+d)<(e+f)=(D_0-D_1)$$

That is, the shaft insertion hole 9 has the inside diameter ($D_0$) larger than the dimension ($D_1$) of the insertion end portion 5c of the pinion shaft 5 in the rotation axis $O_1$ direction, and the difference between the inside diameter ($D_0$) of the shaft insertion hole 9 and the dimension ($D_1$) of the insertion end portion 5c of the pinion shaft 5 in the rotation axis $O_1$ direction provides such dimension as does not prevent the movement of the pinion gear 4 in the rotation axis $O_1$ direction. Here, the clearances a to f express clearances between the respective elements in a direction parallel to the rotation axis $O_1$ (axle direction A).

The pinion gears 4 are supported to be movable in the rotation axis $O_1$ direction by meshing reaction forces provided by their meshing engagement with the paired side gears 3L, 3R. For example, in FIG. 1, when torque transmitted to the left axle is larger than torque transmitted to the right axle, in the pinion gears 4, a meshing reaction force $F_L$ received from the left side gear 3L is larger than a meshing reaction force $F_R$ received from the right side gear 3R, whereby the pinion shaft 5 and pinion gears 4 are moved toward the side gear 3R (toward right in FIG. 3) due to the difference force ΔF ($=F_L-F_R$) between the meshing reaction forces $F_L$ and $F_R$. Also, on the side gear 3R, there is applied an axial-direction meshing reaction force $F_M$ provided by its meshing engagement with the pinion gears 4. In this case, a friction torque (differential limit torque) $T_R$ applied to the side gear 3R is expressed by the following expression.

$$T_R=\mu(\Delta F+F_M)R \quad (1),$$

where R is the mean distance of the thrust washer receiving portion 6Ra from the rotation axis $O_1$ and μ is a coefficient of friction between the side gear 3R and thrust washer 12R.

On the other hand, supposing the pinion shaft 5 does not move in the axle direction A (for example, supposing the pinion gear 4 is fixed to the differential case 2), the meshing reaction force $F_L$ applied from the left side gear 3L is received by the pinion gear 4. Therefore, the friction torque $T_R$ applied to the side gear 3R is expressed by the following expression.

$$T_R=\mu F_M R \quad (2).$$

That is, as can be seen clearly from the above expressions (1) and (2), in the structure where the pinion shaft 5 can be moved in the axle direction A, the friction torque $T_R$ increases. The thus increased friction torque can prevent the differential rotation of the side gears 3L, 3R, whereby, for example, when the vehicle runs on a low μ road, the slippage of the wheels can be prevented. Here, the left side gear 3L receives friction torque corresponding to the meshing reaction force $F_L$.

<Operation of Vehicle Differential Apparatus 1>

Next, description is given of the operation of the vehicle differential apparatus 1 of the first embodiment.

In FIG. 1, when torque from the engine of the vehicle is input through a drive pinion and a ring gear into the differential case 2, the differential case 2 is rotated around the rotation axis $O_1$. With the rotation of the differential case 2, the rotation power is transmitted to the pinion shaft 5 and pinion gears 4 and is further transmitted from the pinion gears 4 to the side gears 3L, 3R. Since the left and right side gears 4 are spline engaged with their respective axles, the torque from the engine side is transmitted to the left and right axles through the driving pinion, ring gear, differential case 2, pinion shaft 5, pinion gears 4 and side gears 3L, 3R.

Here, in the case that the vehicle is in a forward straight advancement acceleration state and no slippage is produced between the respective left and right wheels and road surface, when the torque from the engine side is transmitted to differential case 2, the pinion gears 4 are caused to rotate around the axes of the side gears 3L, 3R without rotating on their own axes and thus the pinion gears 4 and side gears 3L, 3R are caused to rotate integrally with the differential case 2 and pinion shaft 5, whereby the torque from the engine side is transmitted to the respective left and right axles equally and thus the respective left and right axles are caused to rotate at an equal number of rotations.

On the other hand, for example, when slippage is caused between the right wheel and road surface, the pinion gears 4 are caused to rotate in meshing engagement with the side gears 3L, 3R, whereby the torque from the engine side is distributed differentially between the left and right axles (wheels). That is, the left wheel rotates at a lower speed than the differential case 2, while the right wheel rotates at a higher speed than the differential case 2.

When the paired pinion gears 4 rotate about their own axes while torque is acting on the differential case 2, between the meshing surfaces of the paired pinion gears 4 and paired side gears 3L, 3R, there is generated thrust force which produces friction resistance between the gear back surfaces 4d of the paired pinion gears 4 and the sliding surfaces 8a of the spherical back surface members 8, whereby such friction resistance limits the differential rotation of the paired side gears 3L, 3R.

Also, since such thrust force causes the paired side gears 3L, 3R to move apart from each other, there is generated friction resistance also between the sliding surfaces 3Lc, 3Rc of the paired side gears 3L, 3R and thrust washer receiving portions 6La, 6Ra, whereby this friction resistance also limits the differential rotation of the paired side gears 3L, 3R. In this case, the pinion gears 4 are caused to move along the axle direction A by a difference (ΔF) between a meshing reaction force $F_L$ received from the left side gear 3L and a meshing reaction force $F_R$ received from the right side gear 3R, thereby generating friction torque $T_R$ shown in the above expression (1). This limits the differential rotation of the paired side gears 3L, 3R.

Actions and Effects of First Embodiment

According to the above-described first embodiment, there can be obtained the following actions and effects.

(1) Since the pinion shaft 5 is structured to be movable in the axle direction A relative to the differential case 2, when a differential rotation is generated between the side gears 3L, 3R, friction torque generated between the side gears 3L, 3R can be increased, which increases the differential limit force of the side gears 3L, 3R, thereby enabling the vehicle to run stably.

(2) Since the support structure of the insertion end portion 5c of the pinion shaft 5 is realized simply by the round shaft insertion hole 9 with respect to the differential case 2, the manufacture is facilitated. That is, since the shaft insertion hole 9 of the differential case 2 penetrates through the differential case 2 along a direction perpendicular to rotation axis $O_1$, it can be formed by moving a tool from outside the differential case 2 toward the accommodating space 2a. This facilitates the manufacture and can secure work accuracy.

(3) Since, the sliding surface 8a of the spherical back surface member 8 is formed as a flat surface opposed to the gear back surface 4d of the pinion gear 4, the pinion gear 4 can be moved smoothly along the gear back surface 4d in the rotation axis $O_1$ direction. Also, due to friction resistance generated between the gear back surface 4d and the sliding surface 8a of the spherical back surface member 8 by the rotation (the rotation on its own axis around the pinion shaft 5) of the pinion gear 4, the rotation of the pinion gear 4 is restricted, thereby enabling the differential limit force to increase further.

(4) Since the pinion gears 4, together with the pinion shaft 5, is guided to move in the rotation axis $O_1$ direction by the sliding movements of the guide surfaces 52a of the guide members 52, the shaft insertion hole 9 of the differential case 2 can be formed as a round hole. Thus, for example, when compared with a case where the shaft insertion hole 9 of the differential case 2 is formed as an elongated hole long in the rotation axis $O_1$ direction, the manufacture is facilitated and high work accuracy can be secured. Also, the pinion shaft 5 and pinion gears 4 can be guided smoothly in the rotation axis $O_1$ direction.

(5) Since a difference between the inside diameter ($D_0$) of the shaft insertion hole 9 and the dimension ($D_1$) of the insertion end portion 5c of the pinion shaft 5 in the rotation axis $O_1$ direction is set for such dimension that does not prevent the movements of the pinion gears 4 in the rotation axis $O_1$ direction, the movements of the pinion gears 4 due to a difference between the meshing reaction forces applied to the pinion gears 4 from the left and right side gears 3L and 3R will not be restricted by the contact (interference) between the insertion end portion 5c of the pinion shaft 5 and the inner surface of the shaft insertion hole 9. Thus, the difference the meshing reaction forces applied to the pinion gears from the left and right side gears 3L, 3R enables the pinion gears 4 to positively press one of the paired side gears 3L, 3R against the thrust washer (thrust washer 12L or 12R), whereby the differential limit force increasing effect can be surely obtained.

Second Embodiment

Figure 4A:
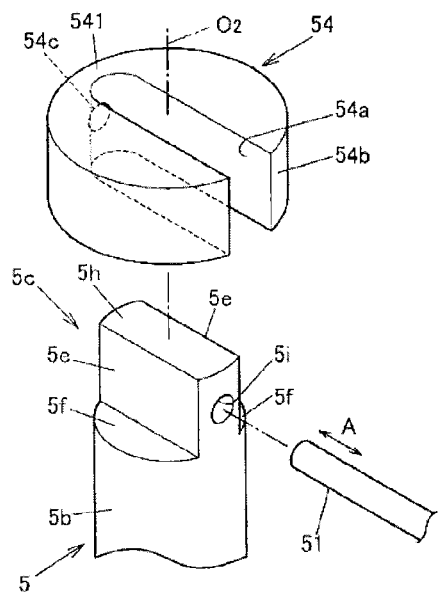
FIGS. 4A to 4D show a support structure of the insertion end portion of a pinion shaft according to a second embodiment.
Figure 4C:
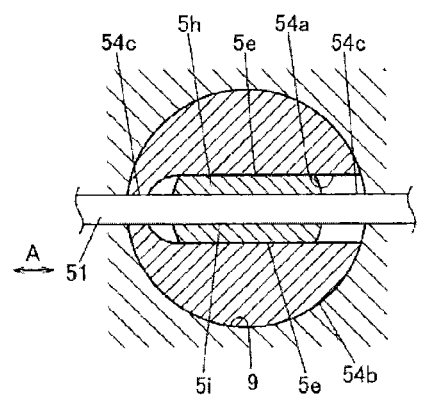
Figure 4B:
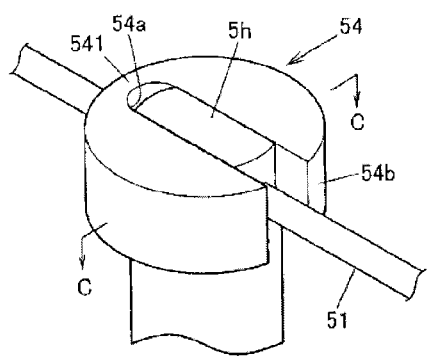
Figure 4D:
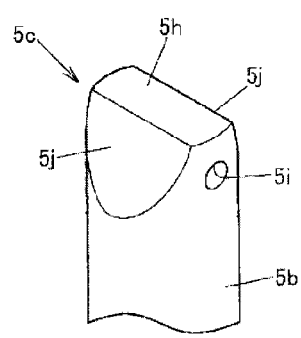

FIGS. 4A to 4D show the insertion end portion 5c of the pinion shaft 5 according to a second embodiment. Specifically, FIG. 4A is an exploded perspective view, FIG. 4B is a perspective view, showing an assembled state, FIG. 4C is a section view taken along the C-C line shown in FIG. 4B, and FIG. 4D is a perspective view of a modification of the insertion end portion 5c of the pinion shaft 5. In the first embodiment, the pinion shaft 5 is guided by the paired guide members 52. On the other hand, in the second embodiment, an elongated hole-shaped guide groove 54a is formed in a single guide member 54 and the pinion shaft 5 and the paired pinion gears 4 are guided along the guide groove 54a, while other composing elements are structured similarly to the first embodiment. Now, description is given mainly of the different portions of the second embodiment.

The guide member 54 has a C-like shape when viewed along the axis $O_2$ of the pinion shaft 5, while its peripheral surface 54b opposed to the inner surface of the shaft insertion hole 9 has an arc-like shape. The guide groove 54a has a linear shape including the arc center (axis $O_2$) of the peripheral surface 54b, while one end in the longitudinal direction is closed by a groove bottom portion 541 and the other end is opened from the peripheral surface 54b. The guide member 54 also includes a penetration hole 54c penetrating through the groove bottom portion 541 along the longitudinal direction of the guide groove 54a. A guide pin 51 is inserted through the penetration hole 54c, whereby the axial direction movement of the guide member 54 is restricted by the guide pin 51. The longitudinal direction of the guide groove 54a is parallel to the axle direction A.

The insertion end portion 5c of the pinion shaft 5 includes a pair of sliding surfaces 5e extending parallel to the axis $O_2$ of the pinion shaft 5 and also parallel to the rotation axis $O_1$ (axle direction A), a pair of sliding end faces 5f extending perpendicularly to the sliding surfaces 5e, and a penetration hole 5i formed in a sliding projection portion 5h intervening between the paired sliding surfaces 5e along the axle direction A.

When a moving force in the axle direction A is applied to the pinion shaft 5 due to the difference between the meshing reactions applied to the pinion gears 4 from the left and right side gears 3L and 3R, the sliding projection portion 5h of the pinion shaft 5 is caused to move in the axle direction A while the sliding surfaces 5e are sliding on the inner surface of the guide groove 54a. The longitudinal direction dimension of the guide groove 54a is set for such dimension that does not prevent the movements of the pinion gears 4 in the rotation axis $O_1$ when they receive the meshing reaction forces with respect to the side gears 3L, 3R.

According to the second embodiment, there can be provided similar effects to the first embodiment and, since the fixing pin 53 is excluded, the number of parts can be reduced when compared with the first embodiment.

Here, the insertion end portion 5c of the pinion shaft 5, as shown in FIG. 4D, the shape of the sliding surface 5j may not be parallel to the axis $O_2$ but may be inclined. In this case, the guide groove 54a may be formed such that its inner surface is parallel to the sliding surface 5j. This modification also can provide similar actions and effects to the first embodiment.

Although the vehicle differential apparatus has been described heretofore with reference to the above respective embodiments, the invention is not limited to these embodiments but can be enforced in various modes without departing from the gist of the invention, for example, the following modifications may also be possible.

Although, in the first and second embodiments, there is employed the structure where a pair of pinion gears 4 are used, the invention is not limited to this but, for example, multiple pairs of pinions or multiple pinion gears may also be used.

Also, in the first and second embodiments, the spherical back surface member 8 is disposed on the back surface side of the pinion gear 4. However, the spherical back surface member 8 may be omitted and a similar sliding surface to the sliding surface 8a of the spherical back surface member 8 may be formed on such surface of the differential case 2 as is opposed to the opinion gear 4, whereby the gear back surface 4d of the pinion gear 4 is allowed to slide on the sliding surface of the differential case 2.

In accordance with one or more embodiments, a vehicle differential apparatus 1 is provided with: a differential case 2 rotatable around a rotation axis $O_1$ by a driving power of a drive source of a vehicle, wherein a first shaft insertion hole 9 is formed along a direction perpendicular to the rotation axis $O_1$; a pair of side gears 3L, 3R rotatably accommodated within the differential case 1 and respectively so connected to a pair of axles of the vehicle as are unrotatable relative thereto; a pinion gear 4 meshing with the paired side gears 3L, 3R, wherein a gear axis of the pinion gear 4 is perpendicular to a gear axis of the side gears 3L, 3R, and wherein a second shaft insertion hole 4c is formed in an axial center portion of the pinion gear 4; and a pinion shaft 5 including an insertion end portion 5c inserted in the first shaft insertion hole 9 of the differential case 2 and a pinion gear support portion 5b inserted in the second shaft insertion hole 4c of the pinion gear 4 to rotatably support the pinion gear 4. The pinion gear 4 is supported so as to be movable in the rotation axis direction $O_1$ by a meshing reaction force generated from a meshing engagement with the pair of side gears 3L, 3R.

The vehicle differential apparatus 1 may include a guide member 52, 54 having a guide surface 52a, 54a parallel to the rotation axis $O_1$ for guiding the pinion gear 4 to move in the rotation axis direction $O_1$ by a sliding movement on the guide surface 52a, 54a.

In the vehicle differential apparatus 1, the first shaft insertion hole 9 may be formed as a penetration hole penetrating through the differential case 2 along the direction perpendicular to the rotation axis $O_1$ and has an inside diameter $D_0$ larger than a dimension $D_1$ of the insertion end portion 5c of the pinion shaft 5 in the rotation axis direction $O_1$. The guide member 52, 54 may be accommodated in the first shaft insertion hole 9 such that the guide surface 52a, 54a is slidable relative to the insertion end portion 5c of the pinion shaft 5, and a difference between the inside diameter $D_0$ of the first shaft insertion hole 9 and the dimension $D_1$ of the insertion end portion 5c of the pinion shaft 5 in the rotation axis direction $O_1$ is set not to prevent the pinion gear 4 from moving in the rotation axis direction $O_1$.

In the vehicle differential apparatus 1, the differential case 2 may be constituted of a one-piece member accommodating therein the side gears 3L, 3R, the pinion gear 4, the pinion shaft 5 and the guide member 52, 54.

The vehicle differential apparatus 1 may include a spacer 8 disposed between an inner surface of the differential case 2 and an opened end face 4d of the second shaft insertion hole 4c of the pinion gear 4. The opened end face 4d of the second shaft insertion hole 4c of the pinion gear 4 and a surface 8a of the spacer 8 opposed to the opened end faces 4d may be formed as flat surfaces extending perpendicularly to the axial direction $O_2$ of the pinion shaft 5.

According to the embodiments, it is easy to manufacture the vehicle differential apparatus, it is possible to secure work accuracy, and the vehicle differential apparatus can raise differential limiting force to enable a vehicle to run stably.

DESCRIPTION OF REFERENCE CHARACTERS AND SIGNS

1: vehicle differential apparatus
2: differential case
2a: accommodating space
2b: pin hole
3L, 3R: side gear
3La, 3Ra: boss portion
3Lb, 3Rb: gear portion
3Lc, 3Rc: sliding surface
3Ld: spline engagement portion
4: pinion gear
4a: base portion
4b: gear portion
4c: shaft insertion hole (second shaft insertion hole)
4d: gear back surface
5: pinion shaft
5a: central portion
5b: pinion gear support portion
5c: insertion end portion
5e: sliding surface
5f: sliding end face
5g: elongated hole
5h: sliding projection portion
5i: penetration hole
5j: sliding surface
6L, 6R: axle insertion hole
6La, 6Ra: thrust washer receiving portion
8: spherical back surface member
8a: sliding surface
8b: curved surface
8c: penetration hole
9: shaft insertion hole (first shaft insertion hole)
12L, 12R: thrust washer
20: ring gear mounting flange
50: notch
51: guide pin
52: guide member
52a: guide surface
52b: peripheral surface
52c: end face
52d: end face
53: fixing pin
54: guide member
54a: guide groove
54b: peripheral surface
54c: penetration hole
541: groove bottom portion
A: axle direction
$O_1$: rotation axis
$O_2$: axis

What is claimed is:
1. A vehicle differential apparatus comprising:
a differential case rotatable around a rotation axis, wherein a first shaft insertion hole is formed along a direction perpendicular to the rotation axis;
a pair of side gears rotatably accommodated within the differential case;

a pinion gear meshing with the paired side gears, wherein a gear axis of the pinion gear is perpendicular to a gear axis of the side gears, and wherein a second shaft insertion hole is formed in an axial center portion of the pinion gear; and a pinion shaft including an insertion end portion inserted in the first shaft insertion hole of the differential case and a pinion gear support portion inserted in the second shaft insertion hole of the pinion gear to rotatably support the pinion gear, wherein the pinion gear is supported so as to be movable in the rotation axis direction by a distance greater than a sum of a clearance between the pinion gear and one of the side gears in the rotation axis direction, and a clearance between said one of the side gears and the differential case in the rotation axis direction, by a meshing reaction force generated from a meshing engagement with the pair of side gears.

2. The vehicle differential apparatus according to claim 1, further comprising:

a guide member having a guide surface parallel to the rotation axis for guiding the pinion gear to move in the rotation axis direction by a sliding movement on the guide surface.

3. The vehicle differential apparatus according to claim 2, wherein the first shaft insertion hole is formed as a penetration hole penetrating through the differential case along the direction perpendicular to the rotation axis and has an inside diameter larger than a dimension of the insertion end portion of the pinion shaft in the rotation axis direction, and wherein the guide member is accommodated in the first shaft insertion hole such that the guide surface is slidable relative to the insertion end portion of the pinion shaft, and a difference between the inside diameter of the first shaft insertion hole and the dimension of the insertion end portion of the pinion shaft in the rotation axis direction is set not to prevent the pinion gear from moving in the rotation axis direction.

4. The vehicle differential apparatus according to claim 3, wherein the differential case is constituted of a one-piece member accommodating therein the side gears, the pinion gear, the pinion shaft and the guide member.

5. The vehicle differential apparatus according to claim 3, further comprising:

a spacer disposed between an inner surface of the differential case and an opened end face of the second shaft insertion hole of the pinion gear, wherein the opened end face of the second shaft insertion hole of the pinion gear and a surface of the spacer opposed to the opened end faces are formed as flat surfaces extending perpendicularly to the axial direction of the pinion shaft.

6. The vehicle differential apparatus according to claim 4, further comprising:

a spacer disposed between an inner surface of the differential case and an opened end face of the second shaft insertion hole of the pinion gear, wherein the opened end face of the second shaft insertion hole of the pinion gear and a surface of the spacer opposed to the opened end faces are formed as flat surfaces extending perpendicularly to the axial direction of the pinion shaft.

7. The vehicle differential apparatus according to claim 2, wherein the differential case is constituted of a one-piece member accommodating therein the side gears, the pinion gear, the pinion shaft and the guide member.

8. The vehicle differential apparatus according to claim 7, further comprising:

a spacer disposed between an inner surface of the differential case and an opened end face of the second shaft insertion hole of the pinion gear, wherein the opened end face of the second shaft insertion hole of the pinion gear and a surface of the spacer opposed to the opened end faces are formed as flat surfaces extending perpendicularly to the axial direction of the pinion shaft.

9. The vehicle differential apparatus according to claim 2, further comprising:

a spacer disposed between an inner surface of the differential case and an opened end face of the second shaft insertion hole of the pinion gear, wherein the opened end face of the second shaft insertion hole of the pinion gear and a surface of the spacer opposed to the opened end faces are formed as flat surfaces extending perpendicularly to the axial direction of the pinion shaft.

10. The vehicle differential apparatus according to claim 2, wherein the first shaft insertion hole is formed as a penetration hole penetrating through the differential case along the direction perpendicular to the rotation axis, wherein the guide member is accommodated in the first shaft insertion hole such that the guide surface is slidable relative to the insertion end portion of the pinion shaft, and wherein the guide member includes an outer peripheral surface having a curved surface corresponding to an inner surface of the first shaft insertion hole.

11. The vehicle differential apparatus according to claim 1, further comprising:

a spacer disposed between an inner surface of the differential case and an opened end face of the second shaft insertion hole of the pinion gear, wherein the opened end face of the second shaft insertion hole of the pinion gear and a surface of the spacer opposed to the opened end face of the second shaft insertion hole are formed as flat surfaces extending perpendicularly to the axial direction of the pinion shaft.

* * * * *